Patented June 1, 1948

2,442,643

UNITED STATES PATENT OFFICE 2,442,643

PROCESS OF ACTIVATING POLYMERIZATION OF HYDROCARBONS

William E. Elwell and Richard L. Meier, Berkeley, Calif., assignors to California Research Corporation, San Francisco, Calif., a corporation of Delaware No Drawing. Application April 2, 1946, Serial No. 659,023

8 Claims. (Cl. 260—669)

This invention relates to a new process of polymerizing unsaturated hydrocarbons and, more particularly, to a new process of polymerizing mono-olefins either alone or with copolymerizable monomers.

Olefins have been polymerized in the past by employing boron fluoride as a catalyst. It possesses a great number of advantages over other acid-type catalysts, for instance: being a gas it is easy to handle; it can be readily recovered from the polymeric product; it may be used at low temperatures because of its low boiling point (—101° C.); it does not give rise to undesirable side-reaction products.

However, it has been observed that boron fluoride is not sufficiently active to readily polymerize normal butylenes, propylene and ethylene. Neither could boron fluoride be satisfactorily used to catalyze the copolymerization of said lower normal mono-olefins with diolefins and other unsaturated hydrocarbons, such as, e. g., butadiene and styrene. In all instances, whether of polymerization or copolymerization, the yields were unduly low.

We have found that by catalyzing the polymerization of lower normal mono-olefins with boron fluoride in the presence of small amounts of sulfur dioxide, the yields of the polymers can be remarkably improved and are, in fact, 7 to 30 times higher than those obtained in the absence of sulfur dioxide. Likewise, the heretofore difficultly attainable copolymerization of diolefins, such as butadiene, and of styrene with the lower normal mono-olefins in the presence of boron fluoride catalyst is greatly facilitated by the application of such sulfur dioxide activator, and the corresponding polymer yields are highly satisfactory.

The polymer products which are obtained by employing the boron fluoride catalyst and the sulfur dioxide activator are oily liquids of the lubricating oil viscosity range and are characterized by a somewhat lower viscosity and, consequently, by a lower molecular weight than the products of polymerization of the same monomers in the presence of boron fluoride alone.

The effective amounts of sulfur dioxide to be employed in order to activate the polymerization lie within the range of from about 0.1% to about 1% by volume of the monomers used for the reaction.

The process must be carried out at a temperature not less than about —100° C., in order that the polymerization take place. The reaction may be effected under pressure, depending on the particular requirements of each case, for instance, when so warranted by the nature of the monomer. Inert diluents may be used with the monomer mixtures whenever desired. Inert hydrocarbons, e. g., butane, provide a suitable diluent.

The following examples are given to illustrate the invention, without, however, restricting it to the conditions and proportions specified therein. In all cases the reaction has been effected at atmospheric pressure and reflux temperatures, unless otherwise indicated.

*Example 1.*—250 cc. of propylene and 250 cc. of butane diluent are introduced into a Pyrex-glass reaction cylinder provided with a dry-ice condenser. Liquid sulfur dioxide in an amount of 2 cc. is separately condensed and poured into the reaction mixture. Thereupon the mixture is blown with gaseous boron fluoride for 75 min. at a rate of 50 cc./min. An oily polymer product with a viscosity of 140.6 S. S. U. at 210° F. is obtained in a yield equal to 55% of the original propylene monomer.

In a parallel control test carried out in the absence of sulfur dioxide the polymer yield is but 2% and the viscosity 281.2 S. S. U. at 210° F.

*Example 2.*—100 cc. of propylene, 50 cc. of styrene and 300 cc. of petroleum ether diluent are introduced into the reaction cylinder as described under Example 1, and 2 cc. of liquid sulfur dioxide is added to the reaction mixture. Thereupon gaseous boron fluoride is bubbled through the mixture for 140 min. at a rate of 50 cc./min. An oily polymer product with a viscosity of 164 S. S. U. at 210° F. is obtained in a yield equal to 53% of the original propylene and styrene monomers.

In a parallel control test carried out in the absence of sulfur dioxide the polymer yield is but 7.2% and the viscosity 191 S. S. U. at 210° F.

*Example 3.*—200 cc. of propylene, 50 cc. of butadiene and 200 cc. of butane diluent are introduced into the reaction cylinder as described under Example 1, and 10 cc. of liquid sulfur dioxide is added to the reaction mixture. After gaseous boron fluoride is bubbled through for 2½ to 3 hours at a rate of 100 cc./min., the polymer yield is found to be equal to 45% of the original propylene and butadiene monomers and the viscosity of the polymer is 154.5 S. S. U. at 210° F.

In a parallel control test carried out in the absence of sulfur dioxide the polymer yield is but 5% and the viscosity 248 S. S. U. at 210° F.

*Example 4.*—50 cc. of propylene, 150 cc. of liquid methane and 10 cc. of liquid sulfur dioxide are added into the apparatus of Example 1, and liquid BF₃ introduced into the mixture. No reaction occurs until, upon gradual evaporation of methane, a sudden ebullition is observed. About 10 g. of a red oily polymer is obtained, which, upon purification with clay, has a viscosity of 108.4 S. S. U. at 210° F.

No reaction results in the absence of sulfur dioxide. Neither can ethylene be polymerized at atmospheric pressure and reflux temperature in the absence of sulfur dioxide. Upon the addition of solid sulfur dioxide, however, two products are formed in small yields, one being an oily hydrocarbon and the other a mobile, sulfur-containing, ether-soluble liquid.

Example 5.—In this test the polymerization of ethylene is effected in a high pressure bomb which contains 250 g. of silica gel. First, gaseous sulfur dioxide is fed in under a pressure of 50 lbs./sq. in.; it is followed by boron fluoride until the gauge indicates a pressure of 350 lbs./sq. in. Finally, the bomb is pressured with ethylene till the gauge reads 650 lbs./sq. in. After the bomb is shaken for 90 min. at room temperature, the pressure drops to 350 lbs./sq. in., and the bomb is repressured to 750 lbs./sq. in. and left to stand overnight. Slightly more than 23 g. of dark heavy oil is obtained, which, upon purification with clay, has a viscosity of 81.8 S. S. U. at 210° F.

It is to be understood that, although the examples given hereinbefore relative to the polymerization of lower normally gaseous mono-olefins and their copolymerization with diolefins constitute the preferred applications of the present invention, in its broader aspects the invention embraces the polymerization and copolymerization of other olefins, for instance of pentenes, isoprene, and the like.

We claim:

1. A process comprising polymerization of normal mono-olefins by catalyzing said polymerization with boron fluoride and a polymerization activator comprising sulfur dioxide in an amount of from about 0.1% to about 1% by volume of the mono-olefin.

2. A process comprising copolymerization of a normal mono-olefin with styrene by catalyzing said copolymerization with boron fluoride and an activator comprising sulfur dioxide in an amount of from about 0.1% to about 1% by volume of the comonomers.

3. A process comprising copolymerization of propylene with styrene by catalyzing said copolymerization with boron fluoride and an activator comprising sulfur dioxide in an amount of from about 0.1% to about 1% by volume of said propylene and styrene.

4. A process comprising copolymerization of a normal mono-olefin with a diolefin by catalyzing said copolymerization with boron fluoride and an activator comprising sulfur dioxide in an amount from about 0.1% to about 1% by volume of the comonomers.

5. A process comprising copolymerization of propylene with butadiene by catalyzing said copolymerization with boron fluoride and an activator comprising sulfur dioxide in an amount of from about 0.1% to about 1% by volume of said propylene and butadiene.

6. A process which comprises polymerizing propylene by catalyzing said polymerization with boron fluoride and a polymerization activator comprising sulfur dioxide in an amount from about 0.1% to about 1% by volume based on the olefin.

7. A process which comprises polymerizing a normal olefin with another olefin by catalyzing said polymerization with boron fluoride and a polymerization activator comprising sulfur dioxide in an amount from about 0.1% to about 1% by volume based on the olefin mixture.

8. A process which comprises polymerizing propylene with another olefin by catalyzing said polymerization with boron fluoride and a polymerization activator comprising sulfur dioxide in an amount from about 0.1% to about 1% by volume based on the olefin mixture.

WILLIAM E. ELWELL.
RICHARD L. MEIER.

REFERENCES CITED

The following references are of record in the file of this patent:

UNITED STATES PATENTS

| Number | Name | Date |
|---|---|---|
| 2,142,980 | Huijser et al. | Jan. 3, 1939 |
| 2,220,307 | Whitley et al. | Nov. 5, 1940 |
| 2,229,661 | Mann | Jan. 8, 1941 |
| 2,274,749 | Smyers | Mar. 3, 1942 |
| 2,296,399 | Otto et al. | Sept. 22, 1942 |